Nov. 1, 1966 G. D. CERF 3,283,303

SYNCHRONIZED AND CODED CHARACTER RECOGNITION SYSTEM

Filed July 17, 1959 6 Sheets-Sheet 1

INVENTOR.
GUSTAVE D. CERF

BY Richard Franklin

ATTORNEY

INVENTOR.
GUSTAVE D. CERF
BY Richard Franklin
ATTORNEY

Nov. 1, 1966 G. D. CERF 3,283,303

SYNCHRONIZED AND CODED CHARACTER RECOGNITION SYSTEM

Filed July 17, 1959 6 Sheets-Sheet 3

INVENTOR.
GUSTAVE D. CERF

BY Richard Franklin

ATTORNEY

SYNCHRONIZED AND CODED CHARACTER RECOGNITION SYSTEM

Filed July 17, 1959

INVENTOR.
GUSTAVE D. CERF
BY Richard Franklin
ATTORNEY

INVENTOR.
GUSTAVE D. CERF
BY Richard Franklin
ATTORNEY

INVENTOR.
GUSTAVE D. CERF
BY Richard Franklin
ATTORNEY

United States Patent Office 3,283,303

Patented Nov. 1, 1966

3,283,303

SYNCHRONIZED AND CODED CHARACTER RECOGNITION SYSTEM

Gustave D. Cerf, Norwalk, Conn., assignor to Sperry-Rand Corporation, Wilmington, Del., a corporation of Delaware Filed July 17, 1959, Ser. No. 827,892
8 Claims. (Cl. 340—146.3)

This invention relates generally to character recognition devices. More particularly, it relates to means having information printed thereon which is both readily visually identifiable and machine readable and a machine for reading such information.

There are many situations where it would be advantageous to have printed information simultaneously available both as readily visually identifiable alphabetic and/or numeric characters and also in a form which may be automatically read by a machine. For example, in the field of banking it would be highly desirable to provide information in these two forms on checks and other documents which must be handled by human agents so as to facilitate the automatic processing of such information by data handling devices such as computers.

It has been necessary in the past, in order to process the raw data contained on commercial documents with automatic machines, to have human operators prepare the data in machine usable form such as punched cards or tapes by reading and transcribing that data from the conventional commercial documents. This intermediate step is an expensive and time consuming operation and one which requires great care and expensive error checking devices and techniques to prevent the introduction of errors into the data processing machines. The present invention provides means to perform this intermediate step of translation of data from its conventional form to a machine usable form automatically, without the necessity for human operations.

Previous devices in this field have encountered difficulties in accurately interpreting information which is derived by the automatic reading of such commercial documents. These difficulties have arisen from various causes such as variations in the rate of travel of a document when it moves relative to the sensing element of the automatic reading machine, skew or misalignment in the printing of the information on the commercial document, etc.

Accordingly, it is an object of this invention to provide a document having information magnetically printed thereon in a form which is both readily visually identifiable as conventional alphabetic or numeric characters and also able to be automatically read by a reading machine to produce a correctly spaced series of electric signals uniquely representing the alphabetic or numeric character in a binary form.

It is a further object of this invention to provide a document having information magnetically printed thereon which is both readily visually identifiable as alphabetic or numeric characters and also which will provide a unique train of binary signals when read by a reading machine, the binary information being synchronized and spaced by timing signals further provided by said same magnetically printed information.

It is a further object of this invention to provide an improved magnetic reading machine for sensing readily visually identifiable magnetically recorded information to produce a synchronized, time aligned series of signals conveying information in the binary form without requiring complex and expensive clock circuitry.

It is still another object of this invention to provide a character reading machine which will produce a train of signals representing magnetically recorded information in the binary form despite variations in the speed with which the recorded information moves relative to the machine, or skew or misalignment in the printing of the information on the document.

Generally speaking in accordance with this invention, a support is provided having information printed thereon in ink containing magnetizable substance which when properly magnetized will cause electric signals to be produced when it is sensed by a conventional magnetic sensing device.

This information is presented in two forms; first, as a readily visually identifiable alphabetic or numeric character; and second, as a series of spaced substantially parallel magnetic bars representing that same alphabetic numeric character in binary form. That portion of the information which is visually identifiable is also printed in magnetic ink and each character is so configured as to comprise a plurality of regularly spaced magnetic ink bars, there being at least one of said bars for each possible bar in the binary coded portion of the information. The two forms of information which together represent the same alphabetic or numeric character, are referred to hereafter as an information unit.

Futher, in accordance with this invention, a machine for automatically reading such documents is provided which has two magnetic sensing devices associated therewith. The first magnetic sensing device reads the binary coded information contained in the magnetic bars which comprise the second form in which information is conveyed on a document. The other magnetic sensing device coincidentally reads the plurality of magnetic bars which together comprise and define each alphabetic or numeric recognizable character. The signals provided by the latter sensing device, there being one such signal for each possible bar constituting the binary coded information, serves to time or synchronize the binary information provided by the first magnetic sensing device which appears in the form of a series of electric signals.

For a better understanding of the invention together with other and further objects thereof, reference is had to the following description taken in connection with the accompanying drawings, and its scope will be pointed out with particularity in the appended claims.

Figure 3:
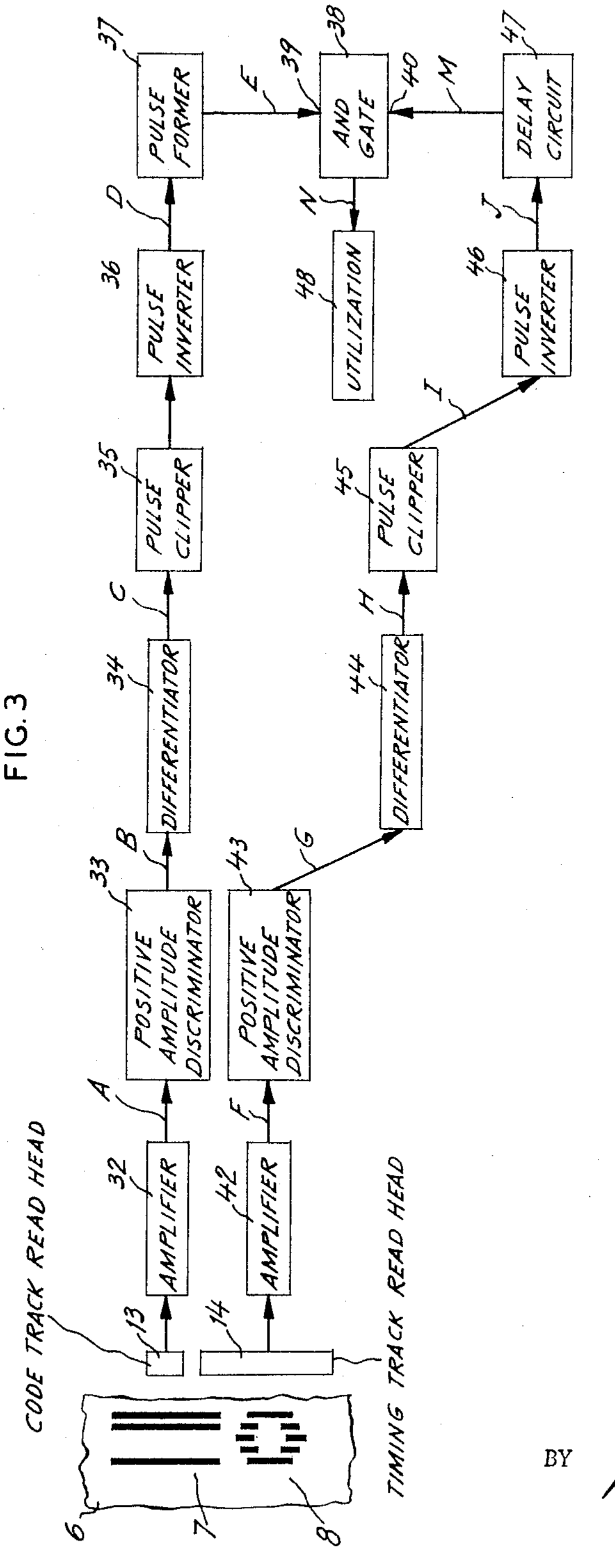
FIG. 3 is a block diagram of the reading machine used in a preferred embodiment of this invention.
Figure 4A:
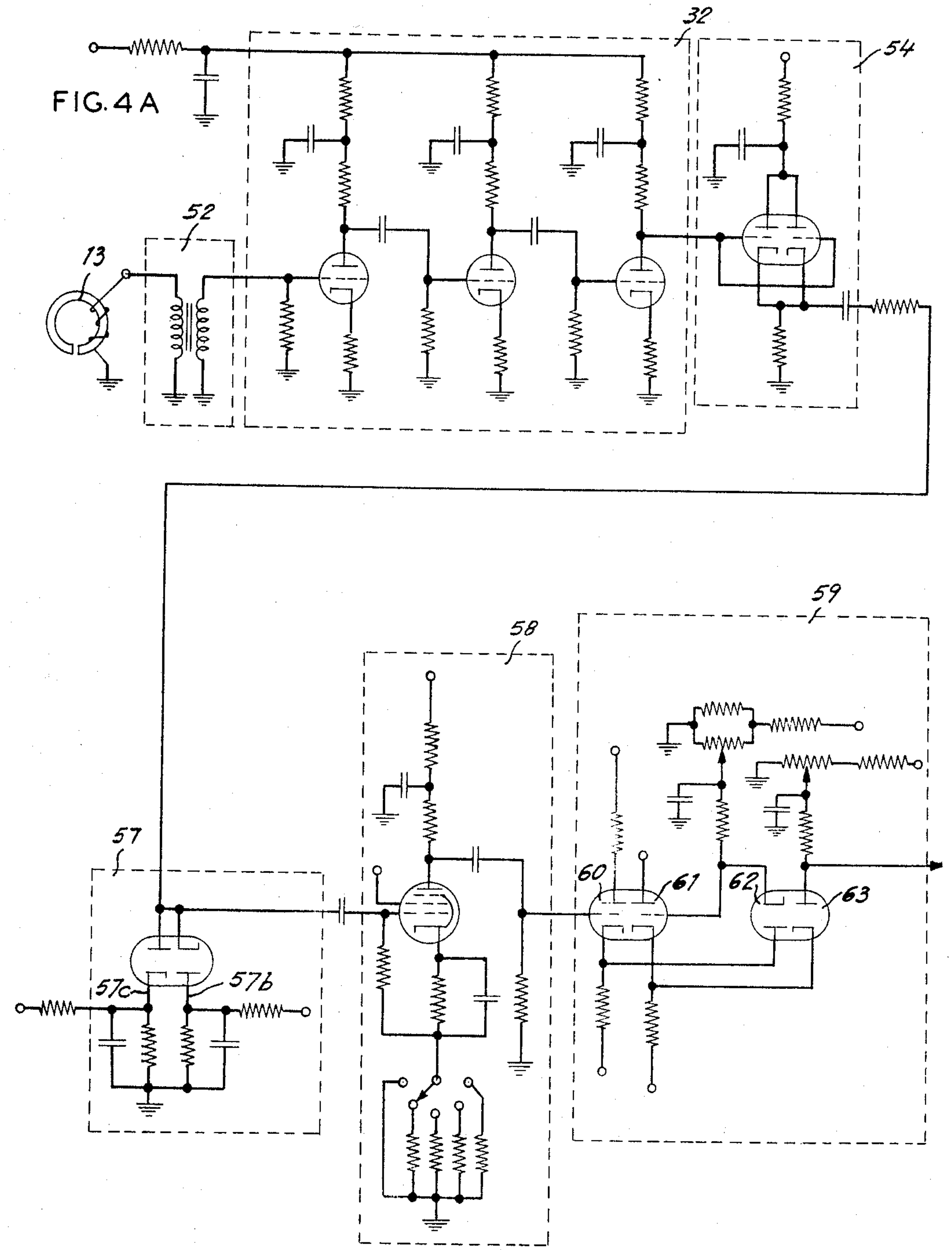
Figure 4B:
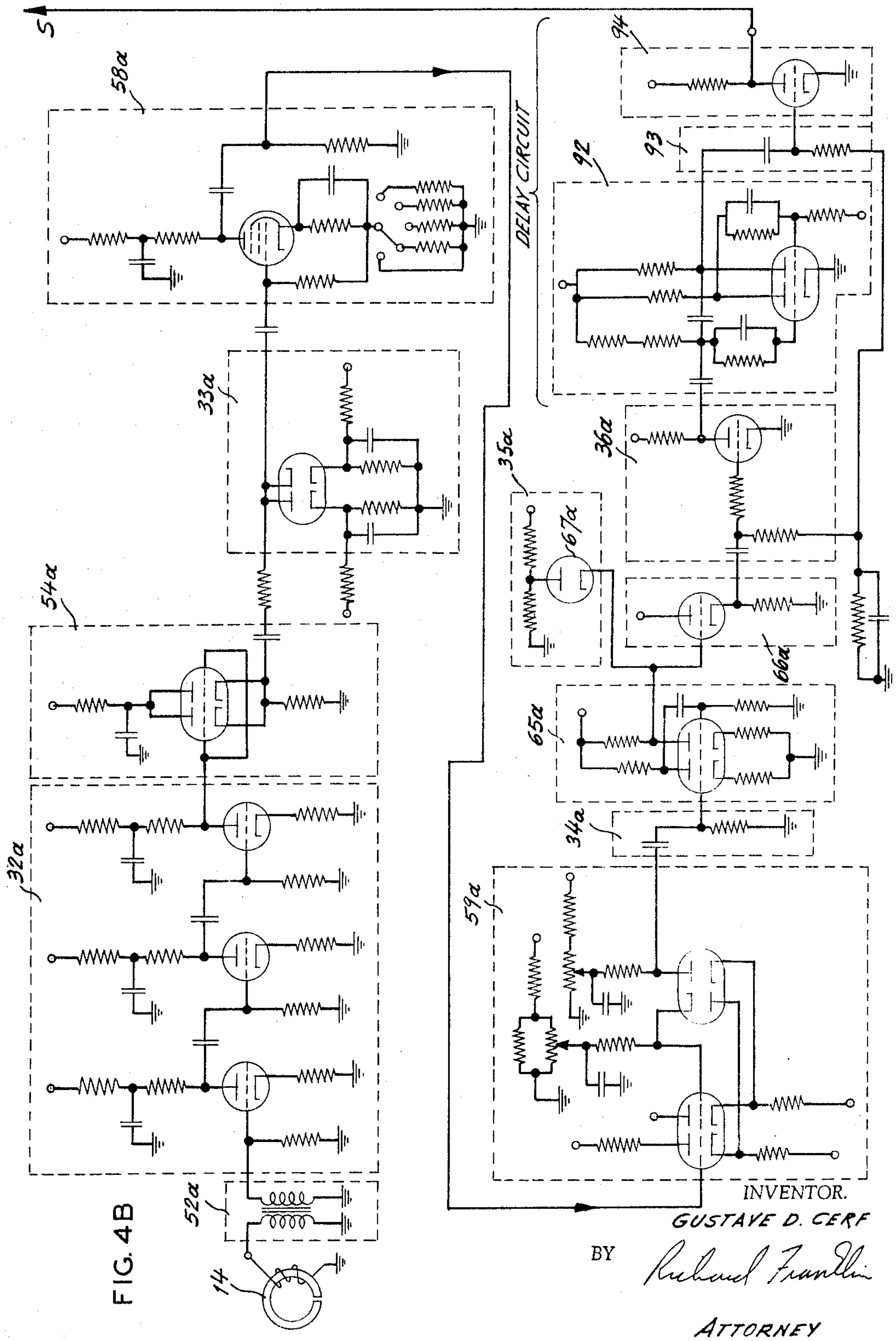
Figures 4C, 4D:
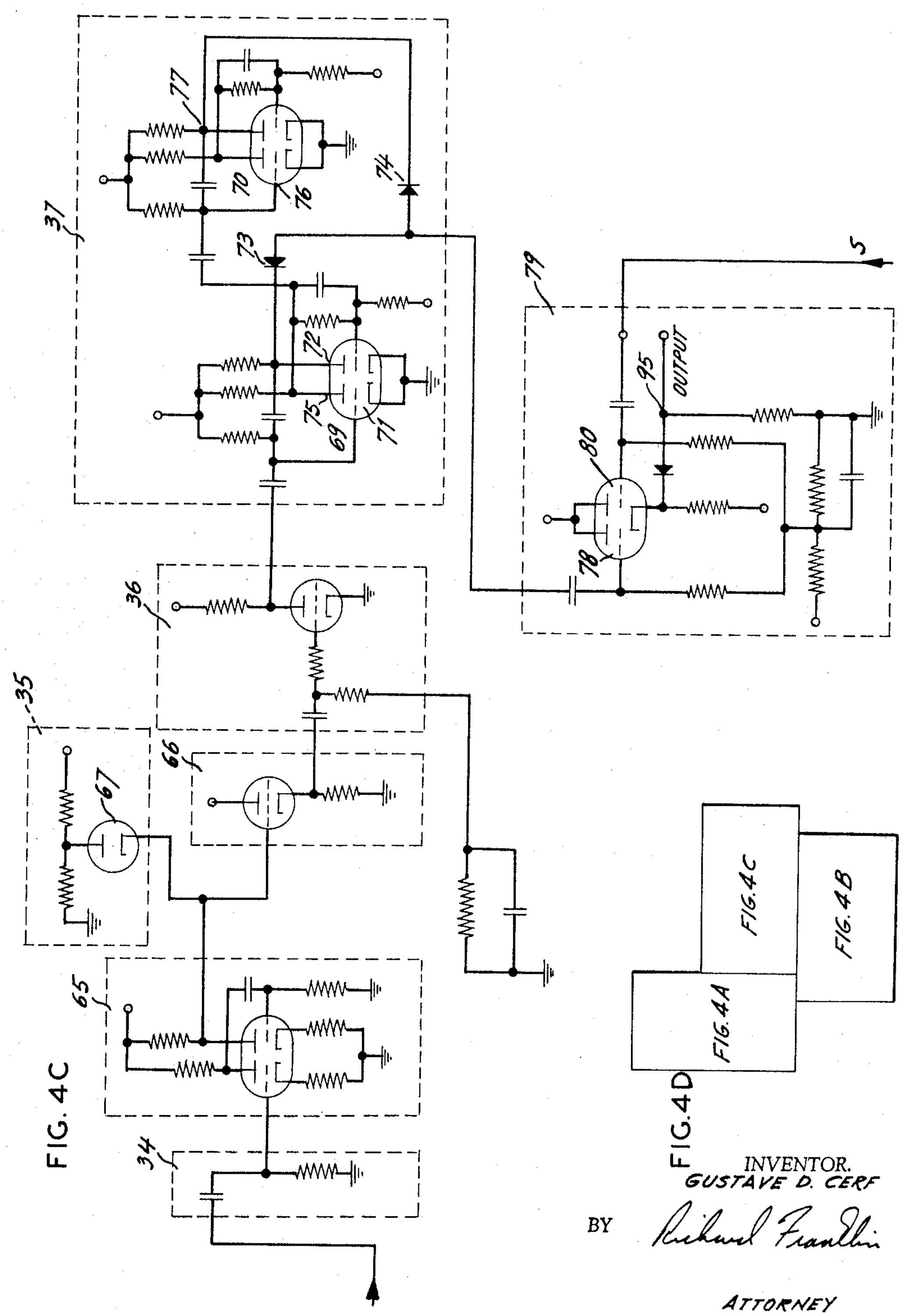
Figure 5:
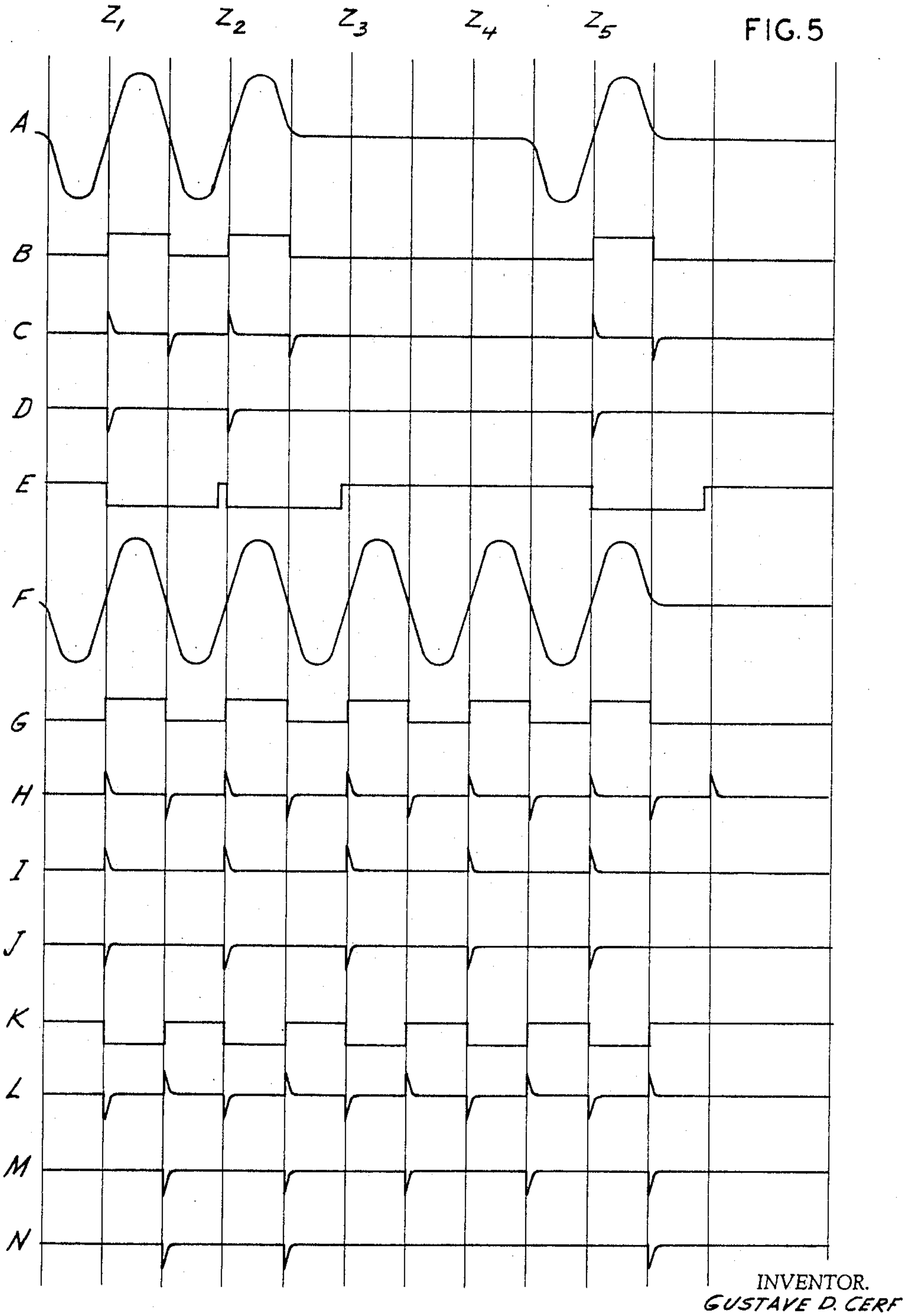

FIG. 4A–4C taken together in the manner shown in FIG. 4D are a schematic diagram of the reading machine of FIG. 3;

FIG. 5, A to N is a series of graphs showing wave forms at various points in the circuit of FIGS. 4A–4C at different times during the reading of a document.

Figure 1:
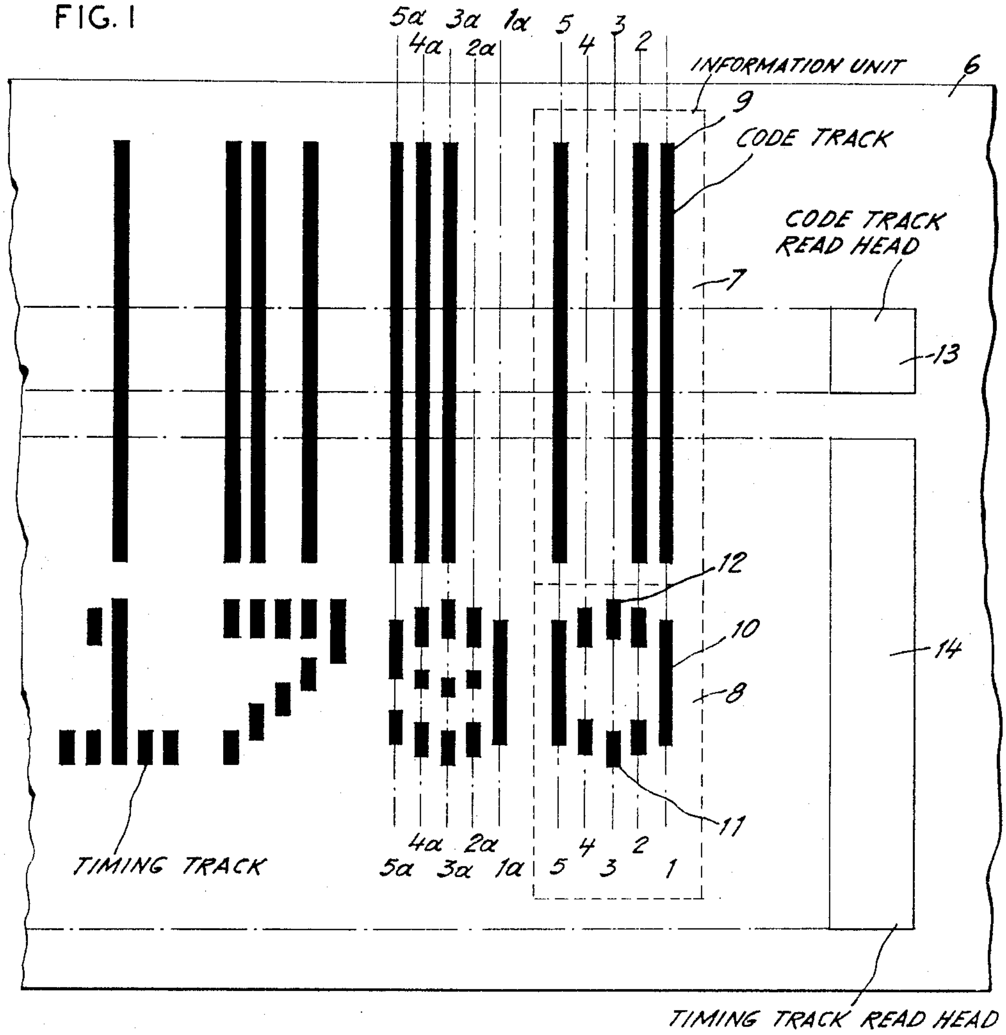
FIG. 1 illustrates a support bearing information magnetically printed in accordance with an embodiment of this invention.

Referring now to FIG. 1, a support 6 such as the surface of a commercial document, i.e., check, bill, invoice, or the like, is shown having intelligence printed thereon in magnetic ink. Each alphabetic or numeric character is represented on support 6 by two portions, a code portion 7 and a visually recognizable portion 8, which together constitute an information unit. Each code portion 7 and visual portion 8 comprises an equal number of adjacent spaces or areas which are numbered 1, 2, 3, 4 and 5 in the embodiment shown in this figure. If more than 5 spaces are desired for the coded portion, then of course, they may be so provided.

Bars of magnetic material 9 may be located in one or more of the five spaces which comprise code portion 7 of each information unit. If the presence of a magnetic bar in a space is considered to represent a binary 1 and if the absence of a magnetic bar in a space is considered to represent a binary 0, then each code portion 7 of each information unit is provided with a pattern of magnetic bars and spaces so as to uniquely represent, in binary form, the alphabetic or numeric intelligence corresponding to the alphabetic or numeric intelligence in associated visual portions.

The number of areas alotted to each information unit determines the number of different characters able to be represented by the code. With 5 such spaces, as is shown in this embodiment there are $2^5$ or 32 distinct binary combinations available.

The visual portion 8 of each information unit is located, in the embodiment shown in this figure, immediately beneath code portion 7 and occupies the same number of spaces (i.e., 5) as does the code portion 7. Visual portion 8 presents in a readily visually identifiable configuration the same alphabetic or numeric information represented in binary form in code portion 7 of that information unit. Each of the figures located in visual portion 8 is defined by a plurality of magnetic ink bars, at least one bar being located in each of said five areas. As is seen from the figure, such stylization does not interfere with the visual identity of the various numbers therein shown. Every bar located in a given one of the five areas of visual portion 8 of each information unit, has substantially the same vertical axis as the bar, if any, which is locted in the corresponding numbered area of code portion 7 of that information unit. It will be seen that certain of areas 1 through 5 of visual portion 8 of each information unit will have more than one bar located therein, as for example bars 11 and 12 in area 3. These bars will have a substantially common vertical axis. The presence of more than one such bar in a given area does not interfere with the operation of this invention, as will be described more fully below.

Magnetic sensing devices 13 and 14 are schematically shown positioned so as to read code portion 7 and visual portion 8 respectively, of the information units. Magnetic sensing devices 13 and 14 are of the type which will provide at an output thereof, a signal of one polarity corresponding to the leading edge of each vertical magnetic ink bar and of the other polarity for each trailing edge of a vertical magnetic ink bar when such magnetic ink bars, having first been properly magnetized in a manner well known to the art, are moved relative to the magnetic sensing devices. It is obvious from inspection of the diagram that magnetic sensing device 13, associated with the code portion 7 of each information unit covers substantially smaller area than does magnetic sensing device 14 which is associated with visual portions 8 of information units. The overlapping of the reading gap of magnetic sensing device 14 onto portions of the bars carrying the binary coded information contained in code portion 7 of the information units does not affect the function of the invention any more than does the presence of more than one bar in a particular area of the visual portion 8 of each information unit, as will be described more fully below.

Figure 2:
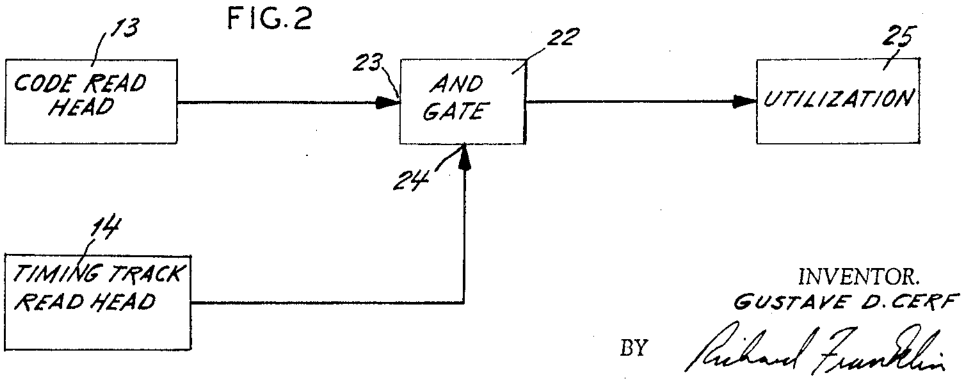
FIG. 2 is a logical representation of the reading machine used in an embodiment of this invention.

Referring now to FIG. 2, let it be assumed that support 6 of FIG. 1, its magnetic printing having been properly polarized, is passing beneath magnetic sensing devices 13 and 14. As each of the areas 1 through 5 of code portion 7 and visual portion 8 of information units pass beneath their respective associated sensing devices, magnetic sensing device 14 will provide one input of each polarity to an AND gate 22 for each of the given areas. Assuming that AND gate 22 is responsive to only negative inputs thereto, then one effective input is applied to AND gate input 24 for each of areas 1–5 of each information unit. At the same time code portion 7 of the same information unit is passing beneath magnetic sensing device 13 and a positive and negative signal will be produced by sensing device 13 and applied to AND gate input 23 each time a magnetic bar in code portion 7 passes underneath sensing device 13. AND gate 22 is of the type which requires a coincidence of two inputs to provide a single output. Consequently signals will appear at the output of AND gate 22 only when a magnetic code bar located in code portion 7 of each information unit coincides with one or more bars located in visual portion 8 of the same information unit.

Thus, in effect, the stylization of visual portion 8 of each information unit, i.e., the representation of each alphabetic or numeric character by means of a plurality of vertical magnetic ink bars with at least one bar being in each area of 1 to 5 of the information unit, provides a timing or synchronizing track for the coded information. Such timing is essential in conveying binary information in order to accurately locate the presence or absence of signals in a correct position relative to other such signals. That is to say, where a particular character is to be binarily represented by the presence of two signals and the absence of three signals, it is vitally important to know whether the signals are to be located as 10100, 11000, 10001, etc. By regularly opening AND gate 22 by means of the timing track built into the visual portion 8 of each information unit, the series of signals which represent a particular alphabetic or numeric character can be meaningfully spaced relative to one another so that there will be no ambiguity or chance of error.

It will now be seen that it does not matter whether a particular area of the visual portion 8 of each information unit has 1, 2, 3 or more bars located therein. So long as each of the five areas has at least one bar therein and so long as the signal produced by sensing device 14 for each area is of a magnitude sufficient to open AND gate 22, the actual number of bars within any given area can be determined solely by the requirements of visual recognizability. Similarly, it follows that it does not adversely affect the operation of this invention to permit magnetic sensing device 14 to overlap a portion of the bars which are located in code portion 7 of the information units. Since each of the five areas of visual portion 8 already have one or more magnetic bars located therein, additional magnetic bars will not harm the operation of this embodiment.

The small area covered by magnetic sensing device 13 relative to the total length of the magnetic bars which are located in code portion 7 associated with that magnetic sensing device, insures that even if, on a particular document, the printing was misaligned, or if the document is slightly off center in being fed through the sensing device, still some portion of the binary coded information will pass beneath the sensing device and the electric signals representing that information will be produced therefrom. Consequently, it is seen that this system has an inherently wide tolerance for misalignment and/or skew. The lengths of the bars located in portions 7 and 8 of the information unit, and the relative width of the magnetic sensing devices 13 and 14 shown in FIG. 1, are merely illustrative and are not intended to constitute a limitation of this invention. The actual sizes ultimately used would be determined by the density of lines required in a particular use as well as the amount of skew tolerance needed. Further, it should be noted that since the binary coded information of each information unit is timed by its own separate timing track, variations in the speed of document feeding cannot cause errors in the positioning of the signals, derived from the magnetic bars in code portion 7 of each information unit, relative to one another.

Referring now to FIG. 3 and the timing diagrams of FIGS. 5(A)–5(N), magnetic sensing devices 13 and 14 are shown positioned to read code portion 7 and visual portion 8 of an information unit representing arabic numeral 0 configured as shown in FIG. 1. When support 6 bearing this information on it is moved relative to magnetic sensing devices 13 and 14, these two sensing devices synchronously read their respective associated portions as has been described above. The outputs from magnetic sensing device 13 associated with code portion 7 are applied to an amplifier stage 32, and the output from amplifier stage 32 is shown in FIG. 5(A). It should be pointed out that the wave form shown in FIG. 5(A) is idealized with respect to variations in amplitude. The peak amplitudes of the wave form shown in FIG. 5(A) may vary over a range of 20 to 1, due to variations in the printing process, printing weight, or document mutilation. The output from amplifier stage 32 is applied to discriminator stage 33 and the output therefrom is shown in FIG. 5(B). That output consists of substantially rectangular positive-going pulses having leading edges coincident with the zero crossing of each signal shown in FIG. 5(A), i.e., $Z_1$, $Z_2$, $Z_5$. It should be noted that the zero crossings of the signals shown in FIG. 5(A) correspond in time to the passage of the physical center of each magnetic bar under its associated magnetic sensing device reading gap. As will be more fully explained below, this permits precise control of subsequent timing and gating operations of the system.

The output pulses from discriminator stage 33 are applied to differentiator stage 34, which produces a peaked output signal of one polarity substantially coincident with the leading edge of each input pulse thereto, and a peaked pulse of the other polarity substantially coincident with the trailing edge of each pulse applied thereto. The peaked output pulses from differentiator stage 34 are shown as a series of positive and negative spokes in FIG. 5(C). The output of differentiator stage 34 is applied to a pulse clipper stage 35, which is chosen so as to pass only the positive-going peaked pulses applied thereto. The output from pulse clipper 35 therefore provides a single positive going peaked pulse which is substantially coincident with each zero crossing of the signal produced by magnetic sensing device 13 and amplifier 32. These positive-going peaked pulses are inverted in pulse inverter 36 and the output therefrom is shown in FIG. 5(D).

The output of pulse inverter 36 is applied to a pulse former stage 37 which produces at its output a negative-going, substantially rectangular wave having each leading edge substantially coincident with a zero crossing of the signal provided by magnetic sensing device 13, and its trailing edge almost coincident with the next zero crossing point which is the point where the next pulse would commence if a bar were located in the next succeeding area. For example, the two consecutive code bars in areas 1 and 2 of code portion 7 of the information unit which represents arabic numeral 0, produces pulses $E_1$ and $E_2$ of FIG. 5(E). These two pulses provide an almost continuous pulse between points $Z_1$ and $Z_3$. The usefulness of these "stretched" pulses, derived from each of the negative-going peaked pulses applied to pulse former stage 37 will become clear as the description of this figure continues. The negative-going, substantially rectangular stretched pulses from pulse former stage 37 are applied as one input to AND gate 38, which is of the type requiring a coincidence of two inputs to produce a single output. AND gate 38, then, is enabled or held open during the entire time each of the pulses shown in FIG. 5(E) is applied thereto.

Coincidentally with the sensing of code portion 7 of the information unit by magnetic sensing device 13, magnetic sensing device 14 senses visual portion 8 of that information unit. The output from magnetic sensing device 14 is applied to amplifier stage 42 and the output from amplifier stage 42 is shown in FIG. 5(F). The output from amplifier stage 42 is applied to discriminator 43, which functions in the same manner as discriminator 33 and produces a series of substantially rectangular positive-going pulses shown in FIG. 5(G). The leading edges of each of these pulses correspond to the zero crossing of each of the signals in the wave form shown in FIG. 5(F), i.e., $Z_1$, $Z_2$, $Z_3$, $Z_4$ and $Z_5$. Here, again, the wave form in FIG. 5(F) has been idealized and variations in amplitude are not shown although such can be expected, as was pointed out above. It should be noted however that despite variations in amplitude between the various pulses in either of the wave forms shown in FIGS. 5(A) and 5(F), discriminator stages 33 or 43 can be so chosen that the outputs therefrom are substantially uniform.

The substantially rectangular, positive-going outputs from discriminator 43 are applied to differentiator stage 44, which, like differentiator stage 34, produces a positive-going peaked signal substantially coincident with the leading edge of each pulse supplied thereto, and a negative-going peaked signal substantially coincident with the trailing edge of each pulse applied thereto. As was the case with differentiator stage 34, the positive-going peaked signals produced by differentiator stage 44 are each substantially coincident with a zero crossing point. It will be seen, that by virtue of the manner of configuration of visual portion 8 of the information unit, whereby at least one bar is located in each of areas 1 through 5 of that information unit, there is a zero crossing at each of positions $Z_1$–$Z_5$ as is shown in FIG. 5(F).

The positive and negative-going peaked signals from differentiator stage 44 shown in FIG. 5(H) are applied to pulse clipper stage 45, which is chosen so as to pass only the positive-going signals applied thereto. The output from pulse clipper stage 45 is shown in FIG. 5(I), and it will be noted that the output therefrom consists of a single peaked pulse at each of zero crossings $Z_1$ through $Z_5$. These peaked output signals are applied to pulse inverter stage 46, which, like its counterpart, pulse inverter stage 36, provides a negative-going peaked output corresponding to each positive-going peaked input thereto. The output from pulse inverter stage 45 shown in FIG. 5(J), is applied to a delay circuit 47. Delay circuit 47 is chosen so as to delay each pulse applied thereto an amount of time equal to one-half the time elapsing between each zero crossing. This is clear from an inspection of the output from delay circuit 47, shown in FIG. 5(M). These outputs from delay circuit 47 are applied as the second input to AND gate 38. It will be noted that as a result of the delay, the peaked, negative-going pulses which represent a bar of magnetic material in each of areas 1–5 of visual portion 8 of each information unit is applied to AND gate 38 at the approximate midpoint in time of the negative-going substantially rectangular pulses which represent each bar located in code portion 7 of the same information unit.

It will now be clear that by virtue of the precise control over timing which is possible by using as a reference the zero crossing point of the various signals, by virtue of the stretching of each "code" pulse in pulse former 37, and by virtue of the delay of each peaked timing pulse in delay circuit 47, there is provided a great inherent tolerance to variations in document speed, misalignment and/or skew. The function, then, of visual portion 8 of each information unit is to provide, through the operation of magnetic sensing device 14 and stages 42, 43, 44, 45, 46 and 47, a built-in timing track which produces a series of peaked pulses, one such pulse for each of the areas 1–5 of the information unit. Coincident with the production of this series of timing pulses, the code portion 7 of each information unit provides through the operation of magnetic sensing device 13 and stages 32, 33, 34, 35, 36 and 37, a pattern of substantially rectangular pulses, each representing the presence of a magnetic bar in one of areas 1–5 of the information unit. Further, by virtue of the use of the zero crossing points throughout, and by virtue of the effect of pulse former 37 taken in conjunction with delay circuit 47, the peaked signals produced by the timing track are located substantially in the center of each rectangular code signal. Application of a peaked timing pulse to AND gate 38 during any part of the time that AND gate is enabled or opened by the application of a rectangular pulse thereto from pulse former 37, will produce an output from the AND gate. The outputs from AND gate 38 which appear as the result of the reading of the information unit representing arabic numeral 0, is shown in FIG. 5(N). As is seen, this consists of a negative-going peaked pulse corresponding to each of the bars of magnetic portion 7 of that information unit and these peaked pulses are properly located in time relative to one another.

The output from AND gate 38 may then be further processed as is schematically indicated by a block 48 which is labelled "utilization."

Referring now to FIGS. 4A–4C taken together in the manner shown in FIG. 4D, numerals which are the same as those used in connection with FIG. 3 refer to similar stages. Magnetic sensing device 13, which in operation would be positioned in operative relation to the code portion 7 of information units configured as shown in FIG. 1, has its output connected to the input of a transformer 52. When a bar of magnetic material is moved relative to the "reading" gap of magnetic sensing device 13, a signal is provided at the output of the sensing device which signal is applied to amplifier stage 32 through coupling transformer 52. The input signals to amplifier stage 32 from transformer 52 is of the order of eight millivolts peak to peak and signals at the output thereof are amplified by a factor of 1000.

The output of amplifier stage 32 is applied through cathode follower 54 to an amplitude discriminator stage 57. Amplitude discriminator stage 57 comprises a pair of oppositely poled diodes **57*c* and 57*b*. The cathode of diode 57*c* is biased at +5 volts and the anode of diode 57*b* is biased at −5 volts thereby limiting the output of the amplitude discriminator stage 57 to an amplitude of 10 volts peak to peak. The output of amplitude discriminator stage 57 is applied to variable gain amplifier 58 which produces at its output a signal of the order of 10 times the amplitude of inputs thereto. Outputs from variable gain amplifier 58 are applied to a binary discriminator stage 59 which comprises cathode followers 60 and 61 and diodes 62 and 63**.

The cathode of cathode follower 60 is connected to the plate of diode 62, the cathode of cathode follower 61 is connected to the cathode of diode 63, and the grid of cathode follower 61 is connected to the cathode of diode 62. The output from variable gain amplifier 58 is applied to the grind of cathode follower 60 and the output from discriminator stage 59 is taken from the plate of diode 63. The cathode of diode 62 and the plate of diode 63 are biased so as to permit binary discriminator stage 59 to pass substantially a two-volt slice of the positive-going portion of signals applied thereto. The wave form of the output of binary discriminator stage 59 is shown in FIG. 5(B). As has been mentioned above in connection with the description of FIG. 3, by using only the positive-going portion of the input signal, the zero crossing points thereof may be used as reference points to adjust the timing of the circuit. Stages 57, 58 and 59 together correspond to discriminator stage 33 of FIG. 3.

The output of the binary discriminator stage 59 is differentiated in differentiator stage 34 shown in FIG. 4C, which is an R-C network having a suitable time constant. The peaked outputs from differentiator stage 34 are applied to the input of a two-stage amplifier 65 and the output therefrom is connected to a cathode follower 66. A diode 67 is connected to the junction of amplifier 65 and cathode follower 66 and is biased so as to permit only positive-going signals to be applied to the input of the cathode follower. The output of cathode follower 66 is applied to a pulse inverter 36 which provides a negative-going peaked input in response to each positive-going peaked input thereto, the output 36 being shown in FIG. 5D.

The negative peaked pulses at the output of pulse inverter 36 are applied to pulse former stage 37, which in the embodiment shown comprises two one-shot multivibrators 69 and 70. Upon the application of each peaked negative-going pulse from the output of inverter 36 to the grid 71 and plate 72 of multivibrator 69, multivibrator 69 is triggered from its stable state to its astable state and produces a negative-going signal at its output. The output from multivibrator 69 is applied to the anode of rectifier 73, making that rectifier conductive. During the time multivibrator 69 is in its astable state, multivibrator 70 remains in its stable state and a rectifier 74 associated with the output of multivibrator 70 is nonconductive. Upon the reversion of multivibrator 69 to its stable state, a negative signal from the plate 75 of multivibrator 69 is applied to the grid 76 and plate 77 of multivibrator 70. The application of this signal to multivibrator 70 triggers multivibrator 70 to its astable state and the negative-going signal at its output is applied to rectifier 74, rendering said rectifier conductive. The anodes of rectifiers 73 and 74 are connected to grid 78 of AND gate 79. AND gate 79 is a coincidence detection device which requires simultaneous inputs on each of grids 78 and 80 in order to produce an output. The outputs from multivibrators 69 and 70 are in effect mixed in rectifiers 73 and 74, and a continuous signal which lasts for the total time multivibrators 69 and 70 are in their astable states is applied to the grid 78 of AND gate 79. This pulse extends in time substantially from a given zero crossing to the next consecutive zero crossing, as is shown in FIG. 5(E).

Considering now the reading of the timing track portion of the information units, reference is made to FIG. 4B. The output of timing track read head 14 is in turn applied to and modified by transformer **52*a*, amplifier stage 32*a*, cathode follower stage 54*a*, amplitude discriminator stage 57*a*, amplifier stage 58*a*, binary discriminator stage 59*a*, differentiating stage 34*a*, amlifier stage 65*a*, cathode follower stage 66*a*, diode 67*a*, and pulse inverter stage 36*a***. Each of these stages operates in the same manner as their corresponding stages in the code reading circuit described above, like stages bearing like numerals with the addition of the letter "*a*."

The result of these operations on the output of timing track read had 14 is the production of a waveform at the output of pulse inverter stage **36*a*, shown as waveform J. Waveform J (FIG. 5) is then applied to a delay circuit which includes one-shot multivibrator 92, differentiator 93, and inverter amplifier 94. The input to the delay circuit is applied to multivibrator 92 which is triggered by the negative pulses applied thereto to produce a substantially square pulse at its output in response to each input, the output pulses each having a duration equal to one-half the period of the output from the timing track read head. The ouput from multivibrator 92 is shown as waveform K (FIG. 5). The output is then applied to differentiator stage 93, the output of which is shown as waveform L (FIG. 5). The output of differentiator stage 93 is applied to inverter amplifier 94** which is biased so as to eliminate all negative going pulses and to invert all positive going pulses, thereby producing an output shown as waveform M (FIG. 4).

As a result of the operation of this delay stage the signals from pulse inverter **36*a* appear at the output of inverter amplifier 94 delayed for a time equal to one-half the period of the output from timing track read head 13, thereby providing for the coincidence of certain ones of the timing pulses with pulses produced by pulse former 37**.

The output of the delay circuit is applied to grid 80 of AND gate 79. Upon simultaneous inputs at grids 78 and 80 of AND gate 79, the AND gate circuit will produce an output which is shown as waveform N of FIG. 5. Reference to FIG. 5, wherein waveform E represents the input applied to grid 78 of AND gate 79 and waveform M represents the input applied to grid 80 of AND gate 79, clearly shows that the one-half period delay provided by the delayed circuit permits the simultaneous application at the two respective grids of AND gate 79 of the pulse representing given timing bar and the pulse representing the code bar located in the zone of the code track coincident with the zone of the timing track in which the said timing bar is located. This circuit thus provides for the precise identification and location of binary "ones" and "zeroes" relative to one another, necessary for the accurate identification of the printed information by the automatic reading machine.

While there has been shown and described what are presently considered to be the preferred embodiments of the invention, it will be obvious to those skilled in the art, that various changes and modifications may be made therein without departing from the invention, and it is therefore intended to cover all such changes and modifications as fall within the true spirit and scope of the invention.

I claim:

1. A document having intelligence thereon which is capable of being visually identified and automatically read by a character reading machine, comprising a support having thereon a plurality of spaced, substantially parallel visible marks consisting of magnetic material, said marks being disposed so as to present the same information in two forms, one of said forms being visually identifiable as alphabetic or numeric characters, the other of said forms being a machine readable binary code, the marks constituting said visually identifiable form being regularly recurring, and uniformly spaced so as to provide a machine usable timing track for timing said machine readable binary code.

2. A document comprising a support, a plurality of discrete, spaced, visible bars printed on said support in magnetic ink, said bars being disposed relative one another to present intelligence in two concurrent forms, one of said forms being a machine-readable binary code track formed by the disposition of a first plurality of said bars into code groups of one or more bars serially disposed along a first linear axis, each of said code groups being the code representation for a given intelligence character and each of said code groups being disposed within an equal segment of said first linear axis, each of said segments being further divided into an equal number of equal zones, the presence or absence of a bar in each zone of a given segment determining the code combination for the intelligance represented within said segment, and the other from of said intelligence being a track comprising a visually identifiable form of the intelligence represented by each of the code groups in said code track, said track of visually identifiable intelligence being formed by the disposition of a second plurality of said bars in groups along a second linear axis parallel to said first linear axis, said second linear axis being divided into segments and zones equal to and coincident with the segments and zones of said first linear axis, each of said visually identifiable intelligence being positioned within a segment of said second linear axis coincident with the segment of said first linear axis occupied by the code group representing said intelligence and each of said visually identifiable intelligence characters being formed by a group of spaced bars disposed relative one another to form the visually identifiable outline of said intelligence, the bars forming each visually identifiable intelligence being further disposed so as to have at least one bar in each of the zones of said segment of the second linear axis occupied by said visually identifiable intelliegnce, thereby providing a machine-readable timing track segment for timing the corresponding code group representing said character, when said first and second forms of each intelligence character are coincidentally sensed by magnetic sensing devices.

3. Apparatus for reproducing recorded information comprising an information record capable of being visually identified and machine read consisting of a support having thereon a plurality of parallel spaced information units of equal width disposed in a substantially linear array, each of said information units comprising first and second portions, each of said portions comprising a chosen number of equal longitudinal zones, corresponding zones in said first and second portions being in registration, one or more of the zones in the first portion having therein a discrete magnetic mark whereby the combination of marks in said first portion defines the code representation for a given character, said second portion having therein a plurality of discrete magnetic marks, said second portion defining the visually identifiable outline of said given character, each of the zones of said second portion having at least one discrete magnetic mark therein whereby the sensing of the first portion by a magnetic sensing device provides a unique first electric signal for each character and whereby the sensing of the second portion by said device provides a second electric signal for timing said first electric signal, a first magnetic sensing device adapted to sequentially read the first portion of each of said information units, a second magnetic sensing device adapted to sequentially read the second portion of each of said information units in synchronization with the reading of the first portion of said information untis, whereby zones in said second portion in registration with the zones in the code track are read simultaneously therewith, and coincidence detection means having a first and a second input terminal, first means coupling said first sensing device to said first input terminal, and second means coupling said second sensing device to said second input terminal, said first sensing device applying a signal to said first input terminal upon reading each of said marks in the zones of the first portions of said information units and said second sensing device applying a signal to said second input terminal upon reading each of said marks in the zones of the second portions of said information units, said coincidence detection means producing an output only upon the coincident application of signals at said first and second input terminals.

4. Apparatus for reproducing recorded information comprising an information record capable of being visually identified and machine read consisting of a support having thereon a plurality of parallel spaced information units of equal width disposed in a substantially linear array, each of said information units comprising first and second portions, each of said portions comprising a chosen number of equal longitudinal zones, corresponding zones in said first and second portions being in registration, one or more of the zones in the first portion having therein a discrete magnetic mark whereby the combination of marks in said first portion defines the code representation for a given character, said second portion having therein a plurality of discrete magnetic marks, said second portion defining the visually identifiable outline of said given character, each of the zones of said second portion having at least one discrete magnetic mark therein whereby the sensing of the first portion by a magnetic sensing device provides a unique first electric signal for each character and whereby the sensing of the second portion by said device provides a second electric signal for timing said first electric signal, a first magnetic sensing device adapted to sequentially read the first portion of each of said information units, a second magnetic sensing device adapted to sequentially read the second portion of each of said information units in synchronization with the reading of the first portion of said information units, whereby zones in said second portion in registration with the zones in the code track are read simultaneously therewith, and coincidence detection means having a first and a second input terminal, first means coupling said first sensing device tc said first input terminal, and second means coupling said second sensing device to said second input terminal, said means coupling said first magnetic sensing device to the first input terminal of said coincidence detection means comprises first amplifying means connected to said first sensing device for amplifying the output therefrom, a first amplitude discriminator connected to said first amplifying means for permitting the passage of only that positive portion of said amplified signals within selected amplitude limits, first differentiating means connected to said discriminator for differentiating the output of said first amplitude discriminator, first pulse clipping means connected to said first differentiating means for passing only positive going differentiated signals, means connected to said pulse clipping means for inverting the outputs therefrom and pulse forming means connected to said inverting means responsive to an output pulse from said inverting means to generate a pulse having a duration equal to the period of the output of said second magnetic sensing device and wherein said means coupling said second sensing device to the second input terminal of said coincidence detection means comprises second amplifying means connected to said second reading means for amplifying the output therefrom, a second amplitude discriminator connected to said second amplifying means for permitting the passage of only that positive portion of said amplified signals within selected amplitude limits, second differentiating means connected to said second discriminator for differentiating the output of said second amplitude discriminator, second pulse clipping means connected to said second differentiating means, for passing only positive going differentiated signals, means connected to said second pulse clipping means for inverting the outputs therefrom, and a delay circuit coupling the output of said second pulse clipping means to said second input terminal of said coincidence detection means, said delay circuit having a delay substantially equal to one half the period of the output from said second magnetic sensing device whereby said peaked input to said second input terminal of said coincidence detection means gate is applied substantially at the middle of the signal applied to said first input terminal thereof said first sensing device applying a signal to said first input terminal upon reading each of said marks in the zones of the first portions of said information units and said second sensing device applying a signal to said second input terminal upon reading each of said marks in the zones of the second portions of said information units, said coincidence means producing an output only upon the coincident application of signals at said first and second input terminals.

5. In combination with a document reading machine having at least first and second reading devices for providing a signal in response to the presence of properly polarized magnetic material, and a gate receiving one input from each of said reading devices and providing an output only upon coincidence of signals at said inputs, a document for use with said machine, said document having formed thereon at least one intelligence conveying unit, each of said units having two portions, each portion of each of said units containing the same equal number of zones, the first portion of each of said units having at least one bar of said magnetic material which can be properly polarized in each of said zones, each of said bars in said first portion of each of said units being substantially parallel to and horizontally equispaced from bars in adjacent zones thereof, and at least one bar of said magnetic material which can be properly polarized in one of said zones in said second portion of each of said units, each of said bars in said second portion having a substantially common major axis with the bar or bars in the corresponding zone of said first portion, the pattern of bars and no bars in said second portion providing a unique binary representation for each distinct intelligence character, said pattern of bars in said first portion defining a readily visually identifiable alphabetic or numeric character corresponding to said binary pattern.

6. In combination with a reading machine having first and second reading devices each providing a signal in the presence of properly polarized magnetic material and a gate receiving one input from each of said devices and providing an output only upon coincidence of a signal from said two devices, a document having at least one information unit formed thereon in magnetic ink, said information units comprising a first portion which is machine coded and a second portion which is readily visually identifiable, said first portion containing a number of equal dimensioned areas each capable of containing a uniformly dimensioned and substantially vertical bar, the presence or absence of said bars in particular ones of said areas providing a unique binary representation for each distinct intelligence, said second portion containing the same number of equal dimensioned areas as said first portion, each of said areas in said second portion having at least one substantially vertical bar, each of said bars in said second portion being horizontally equidistant from each bar in adjacent areas, the vertical dimension of said bars in said second portion being chosen so that said bars define readily visually identifiable alphabetic or numeric intelligence.

7. In combination, a support having intelligence thereon which is capable of being visually identifiable and automatically read by a character reading machine, said support having thereon a plurality of spaced, substantially parallel visible marks consisting of magnetic material, which are disposed so as to present the same information in two forms, one of said forms being visually identifiable as alphabetic or numeric characters, the other of said forms being a machine readable binary code, the marks constituting said visually identifiable form being further disposed so as to provide a machine usable timing track for timing said machine readable binary code, and a separate reading head for each of the two forms, the effective area of the head which reads the visually identifiable form being broad enough to overlap the binary code form, and the effective area of the head for the binary code form being substantially narrower than the marks comprising that portion.

8. A document having intelligence thereon which intelligence is capable of being visually recognized and of being automatically read by a character reading machine through which the document is adapted to be moved, comprising a support having information units thereon, each of said information units being allotted an equal predetermined number of adjacent equal zones on said support, a first portion of each of said information units having at least one substantially vertical magnetic ink bar in each of said zones adapted to be read by a magnetic sensing device, said bars being spaced equidistant from adjacent bars in said first portion of each of said units and arranged so that said first portion is readily visually identifiable as a conventional alphabetic or numeric character, a second portion of each of said information units comprising an array of one or more substantially vertical and spaced magnetic ink bars adapted to be read by a magnetic sensing device, said bars being positioned within selected ones of said zones comprising said second portion of said information units, said bars in corresponding zones of said first and second portions of said information units having a substantially common vertical axis, first and second reading devices for providing a signal in response to the proximate passage of a suitably polarized deposit of magnetic ink, and a gate receiving input signals from each of said reading devices and providing an output signal only when signals from said reading devices coincide, said reading devices being positioned relative to said document so that said first reading device provides signals in response to the presence of bars in said first portion of each information unit and said second reading device provides signals in response to the presence of bars in said second portion of each information unit.

References Cited by the Examiner

UNITED STATES PATENTS

| | | | |
|---|---|---|---|
| 2,540,654 | 2/1951 | Cohen et al. | 340—174 |
| 2,781,972 | 2/1957 | Chaimowicz | 235—61.11 |
| 2,788,879 | 4/1957 | Rand | 346—74 |
| 2,807,005 | 9/1957 | Weidenhammer | 340—174 |
| 2,897,267 | 7/1959 | Prince | 346—74 |
| 2,924,812 | 2/1960 | Merritt | 340—149 |
| 2,942,778 | 6/1960 | Broido | 235—61.11 |
| 2,958,568 | 11/1960 | Hagelbarger | 340—174.1 |
| 2,961,649 | 11/1960 | Eldredge et al. | 340—149.1 |
| 2,980,801 | 4/1961 | Reumerman | 250—106 |
| 3,000,000 | 9/1961 | Eldredge | 340—149 |
| 3,037,695 | 6/1962 | Dickinson | 235—61.12 |
| 3,044,696 | 7/1962 | Feissel | 235—61.12 |
| 3,045,905 | 7/1962 | Tarasuk | 235—61.12 |
| 3,048,327 | 7/1962 | Gewickey | 234—16 |
| 3,113,298 | 12/1963 | Poland et al. | 340—146.3 |

MAYNARD R. WILBUR, *Primary Examiner.*

MALCOLM A. MORRISON, JOHN F. BURNS, E. R. REYNOLDS, J. E. SMITH, J. S. IANDIORIO, J. W. DORITY, *Assistant Examiners.*